(12) United States Patent
Jung et al.

(10) Patent No.: US 7,226,698 B2
(45) Date of Patent: Jun. 5, 2007

(54) POSITIVE ACTIVE MATERIAL FOR RECHARGEABLE LITHIUM BATTERY, METHOD OF PREPARING SAME, AND RECHARGEABLE LITHIUM BATTERY COMPRISING SAME

(75) Inventors: Hyun-Sook Jung, Seoul (KR); Geun-Bae Kim, Suwon-si (KR)

(73) Assignee: Samsung SDI Co., Ltd, Suwon-si (KR)

( * ) Notice: Subject to any disclaimer, the term of this patent is extended or adjusted under 35 U.S.C. 154(b) by 497 days.

(21) Appl. No.: 10/892,991

(22) Filed: Jul. 16, 2004

(65) Prior Publication Data
US 2005/0014065 A1    Jan. 20, 2005

(30) Foreign Application Priority Data
Jul. 18, 2003    (KR)    ........... 10-2003-0049020

(51) Int. Cl.
*H01M 4/58* (2006.01)
*H01M 4/50* (2006.01)
*C01D 1/02* (2006.01)
*C01F 7/00* (2006.01)

(52) U.S. Cl. .............. 429/231.3; 429/231.1; 429/223; 429/224; 429/231.5; 429/231.95; 423/594.4; 423/594.6; 423/599

(58) Field of Classification Search ............. 429/231.1, 429/223, 231.3, 224, 231.5, 231.95; 423/594.4, 423/594.6, 598, 599, 600
See application file for complete search history.

(56) References Cited

U.S. PATENT DOCUMENTS 5,993,998 A    11/1999   Yasuda 6,893,776 B2 *   5/2005   Naruoka et al. ......... 429/231.3

FOREIGN PATENT DOCUMENTS

JP    8-213015    8/1996

OTHER PUBLICATIONS

Rossen, et al., "Structure and electrochemistry of $Li_xMn_yNi_{1-y}O_2$" Solid State Ionics, vol. 57, Issues 3-4, Oct. 1992, pp. 311-318 Abstract Only.
Delmas, et al., "The cycling properties of the $Li_xNi_{1-y}Co_yO_2$ electrode" Journal of Power Sources, vol. 44, Issues 1-3, Apr. 15, 1993, pp. 595-602 Abstract Only.
Patent Abstract of Japan, Publication No. 08-213015, Published Aug. 20, 1996, in the name of Iwakoshi, et al.

* cited by examiner

*Primary Examiner*—Patrick J Ryan
*Assistant Examiner*—Thomas H. Parsons
(74) *Attorney, Agent, or Firm*—Christie, Parker & Hale, LLP (57) ABSTRACT

Disclosed is a positive active material for a lithium rechargeable battery, a method of preparing the same, and a lithium rechargeable battery comprising the same. The positive active material has an $I_{(003)}/I_{(104)}$ intensity ratio of between 1.15 to 1 and 1.21 to 1 in an X ray diffraction pattern using CuKα ray, wherein $I_{(003)}/I_{(104)}$ is the X-ray diffraction intensity of the (003) plane divided by the X-ray diffraction intensity of the (104) plane. The compound is represented by the formula:

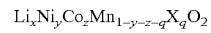

$Li_xNi_yCo_zMn_{1-y-z-q}X_qO_2$ wherein x≧1.05, 0<y<0.35, 0<z<0.35, X is Al, Mg, Sr, Ti or La, and 0≦q<0.1.

20 Claims, 6 Drawing Sheets
(2 of 6 Drawing Sheet(s) Filed in Color)

POSITIVE ACTIVE MATERIAL FOR RECHARGEABLE LITHIUM BATTERY, METHOD OF PREPARING SAME, AND RECHARGEABLE LITHIUM BATTERY COMPRISING SAME

CROSS REFERENCE TO RELATED APPLICATION

This application is based on and claims priority of Korean Patent Application No. 2003-49020 filed in the Korean Intellectual Property Office on Jul. 18, 2003, the entire disclosure of which is incorporated herein by reference.

FIELD OF THE INVENTION

The present invention relates to a positive active material for a lithium rechargeable battery, a method of preparing such a positive active material, and a lithium rechargeable battery comprising such positive active material. The positive active material has high capacity and good cycle life characteristics even when applying a high voltage.

BACKGROUND OF THE INVENTION

The use of portable electronic instruments is increasing as electronic equipment gets smaller and lighter due to developments in the high-tech electronics industry. Studies on lithium rechargeable batteries are actively being pursued in accordance with increased needs for batteries having high energy density for use as a power source in portable electronic instruments.

Lithium rechargeable batteries include a positive electrode and a negative electrode capable of reversibly intercalating lithium ions, and an organic electrolyte or a polymer electrolyte loaded between the positive electrode and the negative electrode. The batteries produce and store electrical energy as a result of a redox reaction caused upon intercalating/deintercalating the lithium ions at the positive electrode and the negative electrode.

Lithium metal is commonly used as the negative active material for a lithium rechargeable battery. However, the use of lithium may cause problems in that the lithium forms dendrites which can cause a short circuit in such a battery, and sometimes even an explosion. Considering these problems, carbonaceous materials such as amorphous carbon or crystalline carbon have been suggested as alternatives to the use of lithium metal.

The positive active material can be considered the most important material for ensuring battery performance and safety. Commonly used materials for the positive active material are chalcogenide compounds, examples of which include complex metal oxides such as $LiCoO_2$, $LiMn_2O_4$, $LiNiO_2$, $LiNi_{1-x}Co_xO_2(0<x<1)$, or $LiMnO_2$. Co-based positive active materials such as $LiCoO_2$ are widely used because of their high energy density ($LiCoO_2$ has a theoretical capacity: 274 mAh/g) and good cycle-life characteristics (capacity retention).

However, because $LiCoO_2$ is structurally unstable, the Li is actually retained at 50% as a form of $Li_xCoO_2(x>0.5)$. That is, when applying a charge voltage of 4.2V relative to the Li metal, the generated capacity is only 140 mAh/g, which is about 50% of the theoretical capacity. Therefore, in order to increase the capacity to more than 50% of the theoretical capacity, the charge voltage should be increased to more than 4.2V. In this case, the atomic value of Li in $Li_xCoO_2$ becomes less than 0.5, and the phase is changed from hexagonal to monoclinic. As a result, it is structurally unstable and the capacity is remarkably deceased upon repeating the cycles.

Accordingly, in order to solve the problems, studies on positive active materials have been undertaken to find an alternative material which is stable at a high charge voltage of more than 4.2V and that has a high energy density and good cycle-life characteristics. For example, $LiNi_xCo_{1-x}O_2$ (0<x<1), $LiNi_xMn_{1-x}O_2(0<x<1)$, and $Li(Ni_xCo_{1-2x}Mn_x)O_2$ (0<x<1) have been suggested, and $LiCoO_2$ and $LiNiO_2$ derivative compounds in which elements such as Ni, Co, and Mn are substituted have also been suggested. (See Solid State Ionics, 57,311 (1992), J. Power Sources, 43–44, 595 (1993); Japanese Patent Laid-open Publication No. H08-213015 assigned to SONY (1996); and U.S. Pat. No. 5,993,998 assigned to Japan Storage Battery (1997)). However, no positive active material capable of substituting $LiCoO_2$ by only changing the composition of Ni, Co, or Mn has been suggested.

SUMMARY OF THE INVENTION

In an embodiment of the present invention, a positive active material for a lithium rechargeable battery is provided exhibiting high capacity and good cycle-life characteristics, and stable at high voltage of more than 4.7V.

In another embodiment of the present invention, a method is set forth for preparing the positive active material for the lithium rechargeable battery having these properties.

In yet another embodiment of the present invention, a lithium rechargeable battery is provided that includes the positive active material.

According to one embodiment of the present invention, a positive active material is provided having an $I_{(003)}/I_{(104)}$ intensity ratio of between 1.15 and 1.21 in an X-ray diffraction pattern using a CuKα ray, wherein $I_{(003)}/I_{(004)}$ is defined as the ratio of the X-ray diffraction intensity of a (003) plane to that of a (104) plane, and wherein the positive active material is a compound represented by the following Formula 1:

$$Li_xNi_yCo_zMn_{1-y-z-q}X_qO_2 \qquad \text{Formula 1}$$

wherein $x \geq 1.05$, $0<y<0.35$, $0<z<0.35$, X is Al, Mg, Sr, Ti or La, and $0 \leq q<0.1$.

In an embodiment of the present invention, a method of preparing a positive active material for a lithium rechargeable battery includes mixing a lithium-included compound with a compound including nickel, cobalt, and manganese in a molar ratio of lithium to nickel, cobalt, and manganese of between 1.05 to 1 and 1.25 to 1; first heating of the mixture at a temperature of between 450 and 550° C.; and then heating of the mixture at a temperature of between 800 and 900° C.

In yet another embodiment of the present invention, a lithium rechargeable battery comprises a positive electrode made from the positive active material; a negative electrode made from a material capable of reversibly intercalating and deintercalating lithium ions; and an electrolyte.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

In the following detailed description, a preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention is directed to a positive active material for a lithium rechargeable battery exhibiting high capacity and good cycle-life characteristics, as it is stable even when the battery is charged and discharged at a high voltage of more than 4.7V.

The positive active material for the lithium rechargeable battery of the present invention is a compound represented by the following Formula 1:

$$Li_xNi_yCo_zMn_{1-y-z-q}X_qO_2 \qquad \text{Formula 1}$$

wherein $x \geq 1.05$, $0 < y < 0.35$, $0 < z < 0.35$, X is Al, Mg, Sr, Ti or La, and $0 \leq q < 0.1$.

The compound has an X-ray diffraction intensity ratio of the (003) plane to that of the (104) plane ($I_{(003)}/I_{(104)}$) of between 1.15 to 1 and 1.21 to 1 for an X-ray diffraction pattern using a CuKα ray. When the intensity ratio is outside of this range, the cycle-life characteristics are remarkably deteriorated.

The positive active material has a molar ratio of lithium to the elements Ni, Co, and Mn of between 1.05 to 1 and 1.25 to 1. When the molar ratio is outside of this range, the cycle-life characteristics are remarkably deteriorated.

In addition, for the crystalline structure of the positive active material, the length of the a-axis is between 2.851 Å and 2.861 Å, and the length of the c-axis is between 14.200 Å and 14.230 Å. Preferably, the positive active material has three XPS peaks representing the Ni(2P3/2) linkage at 854 to 855 eV, 856 to 856.6 eV, and 861.0 to 861.5 eV, and two XPS peaks representing the Mn(2P3/2) linkage at 642.4 to 642.6 eV and 643.5 to 644.1 eV. When the properties of the positive active material are outside of this range, a battery with a high capacity and good cycle-life characteristics cannot be provided.

A positive active material having the above-mentioned properties can be obtained by the following method. A lithium-included compound is mixed with a compound including at least one element of nickel, cobalt, and manganese. In this case, a molar ratio of the lithium to the elements nickel, cobalt, and manganese is preferably between 1.05 to 1 and 1.21 to 1. The lithium-included compound may include, but is not limited to, lithium hydroxide, lithium nitrate, or lithium acetate. The compound including nickel, cobalt, and manganese may be selected from the group consisting of hydroxides, oxides, nitrates, and sulfates.

The mixture is subjected to a first heating treatment at a temperature between 450 and 550° C. The duration of the first heating treatment is adjusted depending on the heating temperature. Generally, the first heating treatment is continued for 10 to 15 hours at the above temperature range, which allows the lithium compound to be diffused into the compound including nickel, cobalt, and manganese. After finishing the first heating treatment, the resulting compound may be immediately subjected to a second heating treatment. However, in one embodiment, it is first slowly cooled to room temperature and re-mixed before being subjected to the second heating treatment at a temperature between 800 and 900° C. The duration of the second heating treatment may be adjusted depending upon the heating temperature. The second heating treatment is generally continued for between 10 and 20 hours at the above temperature range.

Figure 1:
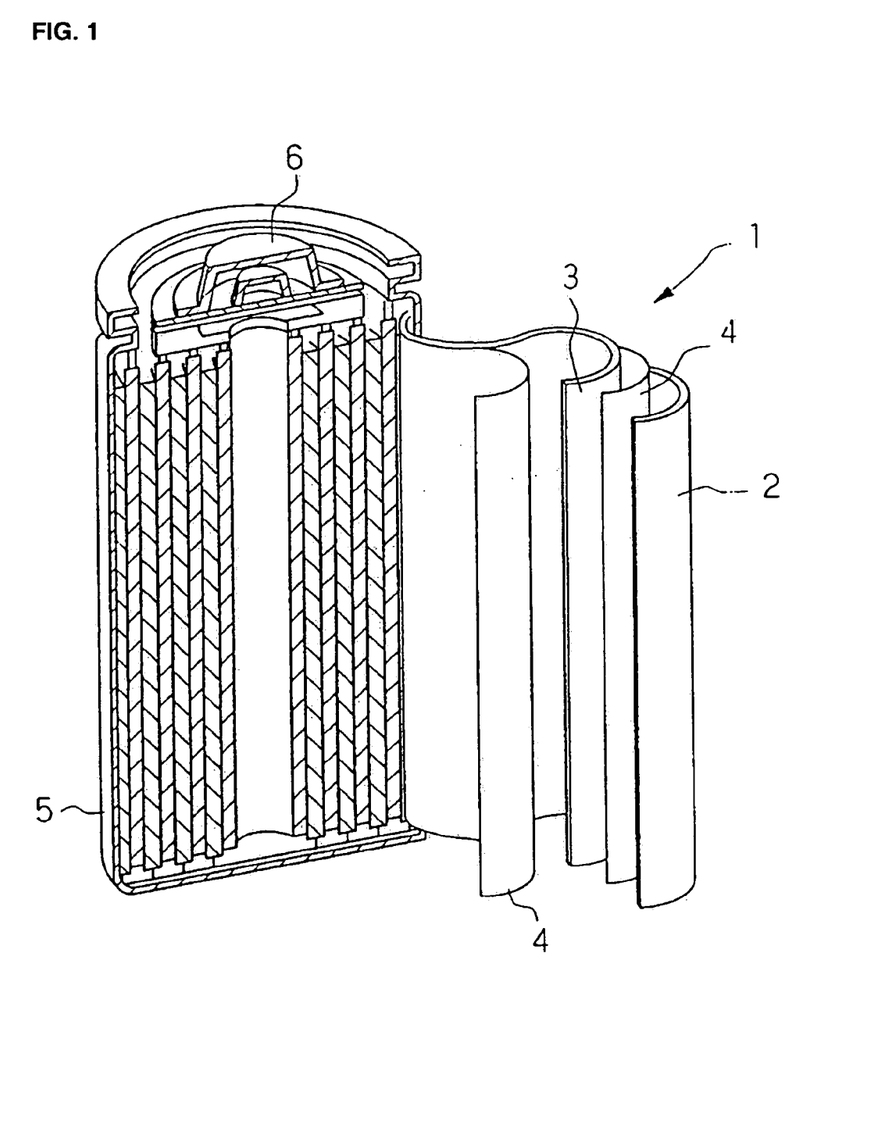
FIG. 1 is a schematic view showing the structure of the lithium rechargeable battery according to the present invention.

One embodiment of the lithium rechargeable battery according to the present invention is shown in FIG. 1. The rechargeable lithium battery includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into a prismatic or pouch type battery as is well understood in the related art.

The negative active material may include a material capable of reversibly intercalating and deintercalating lithium ions, or a material capable of forming a lithium-included compound by reversibly reacting with the lithium. Representative examples of materials capable of reversibly intercalating lithium ions include crystalline or amorphous carbon, or carbonaceous material of a carbon complex. Representative examples of compounds capable of forming lithium-included compounds by reacting with lithium ions include tin oxide ($SnO_2$), titanium nitrate, silicone (Si), and other compounds. The lithium alloy may include a lithium alloy with any metal selected from the group consisting of Na, K, Rb, Cs, Fr, Be, Mg, Ca, Sr, Ba, Ra, Al, and Sn.

The electrolyte includes a lithium salt and a non-aqueous organic solvent. The lithium salt is dissolved in an organic solvent and acts as a source of lithium ions in the battery. It also facilitates the movement of lithium ions between the negative and the positive electrodes and enables the lithium rechargeable battery to work. A representative example of a lithium salt includes a supporting electrolyte salt selected from the group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (wherein x and y are natural numbers), LiCl, LiI, and combinations thereof. The concentration of the lithium salt is preferably between 0.6 and 2.0M. When the concentration of the lithium salt is less than 0.6M, the conductivity of the electrolyte is decreased so that the electrolyte performance is deteriorated, while when the concentration is more than 2.0M, the viscosity of the electrolyte is too high to facilitate movement of lithium ions.

The non-aqueous organic solvent acts as a medium for the ions which take part in the electrochemical reaction. Suitable non-aqueous solvents include those selected from the group consisting of carbonates, esters, ethers, ketones, and combinations thereof. The carbonate may be a cyclic carbonate or a chain carbonate. When one or more of the organic solvents are mixed, the mixing ratio may be suitably adjusted depending upon the desired battery performance, which is widely understood by those skilled in the art. Cyclic carbonates include those selected from the group consisting of ethylene carbonate, propylene carbonate, and mixtures thereof. Chain carbonates include those selected from the group consisting of dimethyl carbonate, diethyl carbonate, ethyl methyl carbonate, methyl propyl carbonate, and mixtures thereof. Suitable esters include γ (gamma)-butyrolactone, valerolactone, decanolide, mevalolactone, and similar esters. Suitable ketones include poly methyl vinyl ketone.

The following examples further illustrate the present invention in detail, but are not to be construed to limit the scope thereof.

COMPARATIVE EXAMPLE 1

A $Ni_{1/3}Co_{1/3}Mn_{1/3}(OH)_2$ complex hydroxide (hereinafter referred to as the precursor) was mixed with $LiOH.H_2O$ in a molar ratio of (Ni+Co+Mn):Li of 1:1, and pulverized using a ball mill for about 2 hours. The resulting mixture was subjected to a first heating treatment at 480° C. under atmosphere for 5 hours, and slowly cooled to room temperature. Then, the mixture was remixed using a mortar for 30 minutes and subjected to a second heating treatment at 1000° C. for 20 hours. The mixture was then cooled to room temperature and filtered though a filter having a mesh of 45 μm (micrometers) to prepare a positive active material of $Li(Ni_{1/3}Co_{1/3}Mn_{1/3})O_2$.

In order to analyze the structure of the positive active material, X-Ray Diffraction was carried out.

COMPARATIVE EXAMPLE 2

A positive active material was a commercially available $LiCoO_2$.

COMPARATIVE EXAMPLE 3

A positive active material was prepared by the same procedure as in Comparative Example 1, except that the molar ratio of the precursor: $LiOH.H_2O$ was 1:1.15 to provide a $Li_{1.15}(Ni_{1/3}Co_{1/3}Mn_{1/3})O_2$ positive active material.

COMPARATIVE EXAMPLE 4

A positive active material was prepared by the same procedure as in Comparative Example 1, except that the molar ratio of the precursor: $LiOH.H_2O$ was 1:1.30 and the second heating treatment was carried out at 900° C. to provide a $Li_{1.30}(Ni_{1/3}Co_{1/3}Mn_{1/3})O_2$ positive active material.

EXAMPLE 1

A $Ni_{1/3}Co_{1/3}Mn_{1/3}(OH)_2$ complex hydroxide (hereinafter referred to as the precursor) was mixed with $LiOH.H_2O$ in a molar ratio of (Ni+Co+Mn):Li of 1:1.05, and pulverized using a ball mill for about 2 hours. The resulting mixture was subjected to a first heating treatment at 500° C. under atmosphere for 10 hours and slowly cooled to room temperature. Then, the mixture was remixed using a mortar for 30 minutes, and subjected to a second heating treatment at 900° C. for 15 hours. The mixture was then cooled to room temperature and filtered though a filter having a mesh of 45 μm (micrometers) to provide a positive active material of $Li_{1.05}(Ni_{1/3}Co_{1/3}Mn_{1/3})O_2$.

EXAMPLE 2

A positive active material was prepared by the same procedure as in Example 1, except that the molar ratio of the precursor: $LiOH.H_2O$ was 1:1.15 to provide a positive active material of $Li_{1.15}(Ni_{1/3}Co_{1/3}Mn_{1/3})O_2$.

EXAMPLE 3

A positive active material was prepared by the same procedure as in Example 1, except that the molar ratio of the precursor: $LiOH.H_2O$ was changed to 1:1.20 to provide a positive active material of $Li_{1.20}(Ni_{1/3}Co_{1/3}Mn_{1/3})O_2$.

EXAMPLE 4

A positive active material was prepared by the same procedure as in Example 1, except that the molar ratio of the precursor was $Ni_{0.32}Co_{0.32}Mn_{0.32}Al_{0.04}(OH)_2$ to provide a positive active material of $Li_{1.05}(Ni_{0.32}Co_{0.32}Mn_{0.32}Al_{0.04})O_2$.

Figure 2:
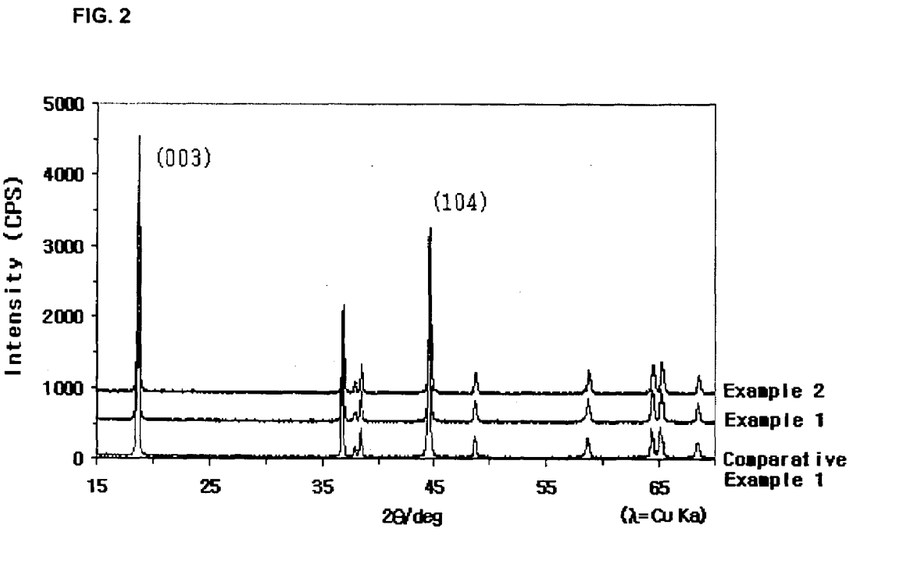
FIG. 2 is a graph showing an XRD pattern of the positive active materials according to Examples 1 and 2 and Comparative Example 1.

The positive active materials of Examples 1 to 4 and Comparative Example 1 were analyzed regarding their structure by X-ray diffraction using a CuKα ray (Bruker D8ADVANCE, CuKα radiation). In order to analyze an XRD pattern and a lattice parameter, an indexing program (Dicvol) was employed. The results are shown in Table 1, and the XRD patterns of Examples 1 and 2 and Comparative Example 1 are shown in FIG. 2.

TABLE 1

|  | a(Å) | c(Å) | (003) d(Å) | (003) 2θ | (003) FWHM (°) | (104) 2θ | (104) FWHM (°) | Intensity ratio $I_{(003)}/I_{(104)}$ |
|---|---|---|---|---|---|---|---|---|
| Comparative Example 1 | 2.8640 | 14.233 | 4.7488 | 18.676 | 0.169 | 44.523 | 0.228 | 0.801 |
| Comparative Example 3 | 2.8681 | 14.235 | 4.7495 | 18.667 | 0.159 | 44.533 | 0.240 | 0.959 |
| Comparative Example 4 | 2.8631 | 14.233 | 4.7445 | 18.650 | 0.160 | 44.541 | 0.220 | 1.052 |
| Example 1 | 2.8601 | 14.230 | 4.7432 | 18.689 | 0.169 | 44.556 | 0.219 | 1.160 |

TABLE 1-continued

|  | a(Å) | c(Å) | d(Å) | (003) 2θ | (003) FWHM (°) | (104) 2θ | (104) FWHM (°) | Intensity ratio $I_{(003)}/I_{(104)}$ |
|---|---|---|---|---|---|---|---|---|
| Example 2 | 2.8544 | 14.220 | 4.7399 | 18.708 | 0.113 | 44.626 | 0.237 | 1.157 |
| Example 3 | 2.8518 | 14.211 | 4.7372 | 18.710 | 0.110 | 44.560 | 0.238 | 1.202 |

*FWHM (°) means Full Width at Half Maximum

As illustrated in Table 1, the positive active materials of Examples 1 to 3 have $I_{(003)}/I_{(104)}$ intensity ratios of between 1.160 and 1.202, while those of Comparative Examples 1, 3, and 4 have intensity ratios of 0.801, 0.959, and 1.052, which are significantly lower than the Examples.

The binding energy of Ni, Co, and Mn in compounds according to Example 1 and Comparative Example 1 were measured by X-ray photoelectron spectroscopy (XPS), and the results are shown in Table 2.

TABLE 2

| XPS data | Ni(2P3/2): three peaks | Mn(2P3/2): two peaks |
|---|---|---|
| Comp. Example 1 | 854 eV, 855.5 eV, 860.3 eV | 641 eV, 642.2 eV |
| Example 1 | 854.8 eV, 856.2 eV, 861.3 eV | 642.4 eV, 643.9 eV |

Error range: ±0.2 eV

As shown in Table 2, in the positive active material of Example 1, three peaks are exhibited at 854 to 855, 856 to 856.6, and 861 to 861.5 eV relating to Ni(2P3/2), and two peaks of 642.4 to 642.6 and 643.5 to 644.1 eV relating to Mn(2P3/2).

Figure 4A:
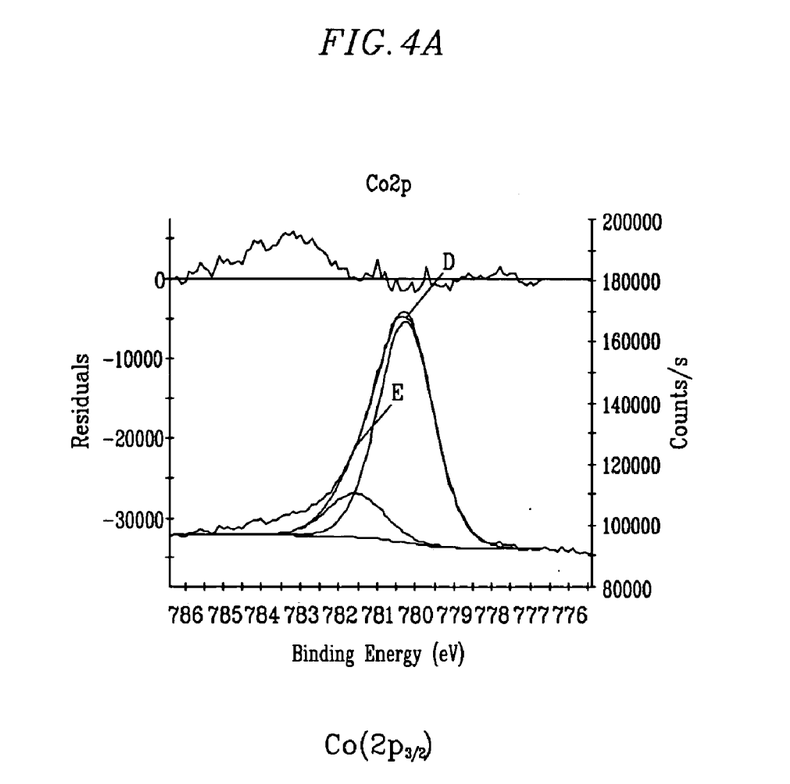
FIGS. 4(a)–4(c) are graphs showing XPS core level spectra of Co, Ni, and Mn for the positive active material according to Example 1.
Figure 4B:
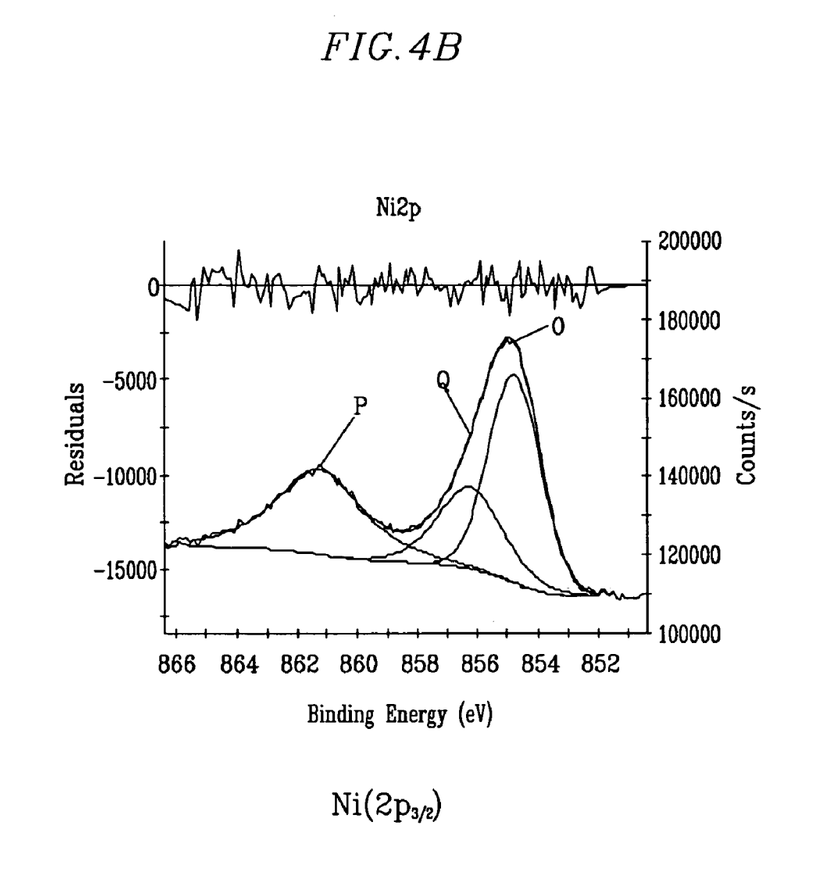
Figure 4C:
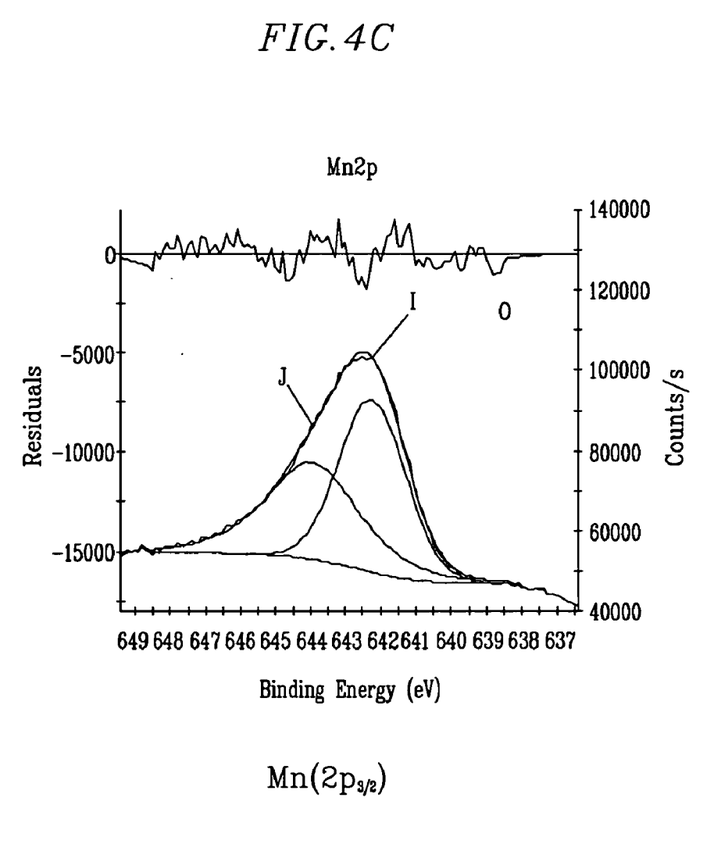

In addition, XPS core level spectra of Co, Ni, and Mn in the positive active material according to Example 1 are shown in FIGS. 4(a), (b), and (c), and the binding energy thereof is shown in Table 3.

TABLE 3

|  | Name | Center (eV) | Area | FWHM |
|---|---|---|---|---|
| Co(2p$_{3/2}$) | D | 780.3 | 127969 | 1.78 |
|  | E | 781.6 | 25222 | 1.77 |
| Ni(2p$_{3/2}$) | O | 854.8 | 142487 | 2.22 |
|  | Q | 856.2 | 28508 | 2.10 |
|  | P | 861.3 | 85206 | 3.56 |
| Mn(2p$_{3/2}$) | I | 642.6 | 100089 | 2.25 |
|  | J | 643.9 | 86752 | 3.21 |

As shown in the results in Tables 1 and 3, the structural properties of positive active materials of Examples 1 to 4 are significantly different from those of Comparative Examples 1 and 2. In order to determine the effects that such structural properties would have on battery performance, batteries were prepared as follows from positive active materials according to Examples 1 to 4 and Comparative Examples 1 and 2, and the performance of the resulting batteries was measured.

Figure 3:
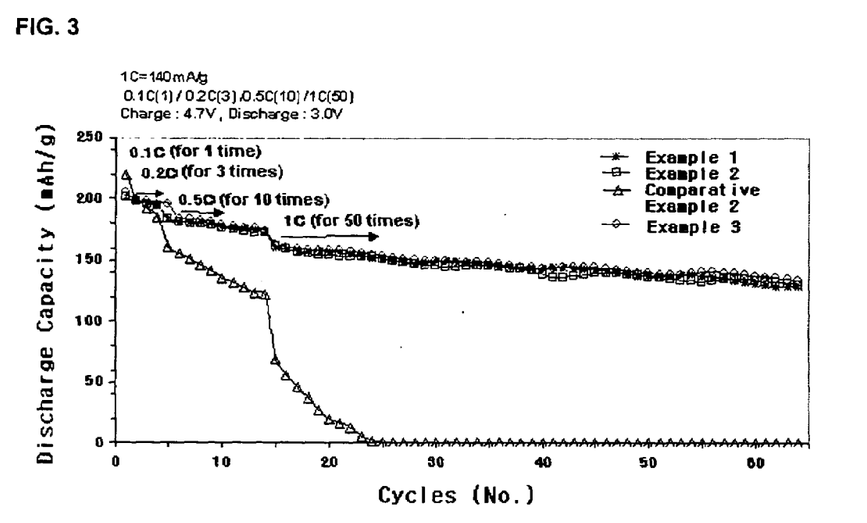
FIG. 3 is a graph showing cycle-life characteristics of the positive active materials according to Examples 1 to 3 and Comparative Example 2.

The positive active material, an acetylene black (62.5 m$^2$/g) conductive agent, and a polyvinylidene fluoride (1.30 dl/g) binder were mixed in a weight ratio of 94:3:3 in an N-methyl-2-pyrrolidone solvent to provide a positive active material slurry. The slurry was coated on an Al-foil current collector to provide a thin electrode (including the thickness of the current collector, of 60 to 70 μm (micrometers)), dried in an oven at 135° C. for 3 hours or more, and pressed to provide a positive electrode. Using the obtained positive electrode and a lithium metal negative electrode, a 2016 coin-type half cell was fabricated. The cell was charged and discharged at 0.1 C ↔ 0.1 C (one cycle), 0.2 C ↔ 0.2 C (three cycles), 0.5 C ↔ 0.5 C (10 cycles), and 1 C ↔ 1 C (50 cycles), at 4.7~3.0V, then the initial capacity and the cycle-life characteristics (capacity retention) were measured. The results are shown in Table 4. The cycle-life characteristics of the batteries including the positive active materials according to Examples 1 to 3 and Comparative Example 2 are shown in FIG. 3.

TABLE 4

|  | Initial capacity (1 C, 1st capacity, mAh · g) | Cycle-life (capacity retention) (1 C, 50th/1st, %) |
|---|---|---|
| Comp. Example 1 | 160 | 60 |
| Comp. Example 2 | 122 | 0 |
| Example 1 | 165 | 85 |
| Example 2 | 164 | 82 |
| Example 3 | 163 | 80 |
| Example 4 | 160 | 80 |

As shown in Table 3, the batteries including the positive active materials according to Examples 1 to 4 had improved initial capacities and good cycle-life characteristics compared to those of Comparative Example 2. When comparing them to the battery of Comparative Example 1, they had similar initial capacities and improved cycle-life characteristics. In addition, as shown in FIG. 3, the capacity of the battery of Comparative Example 2 was remarkably decreased after repeating 15 cycles, and had completely diminished by about 25 cycles.

According to the results of Tables 1 to 4 and FIGS. 1 to 3, a positive active material having properties which do not satisfy the requirements of the present invention cannot provide a battery having a satisfactory capacity and cycle-life characteristics.

As described above, the present invention can provide a high capacity battery with good cycle-life characteristics even when charging at a high voltage.

While the present invention has been described in detail with reference to certain preferred embodiments, those skilled in the art will appreciate that various modifications and substitutions can be made thereto without departing from the spirit and scope of the present invention as set forth in the appended claims.

What is claimed is:

1. A positive active material for a lithium rechargeable battery having an $I_{(003)}/I_{(104)}$ intensity ratio of between 1.15 and 1.21 in an X-ray diffraction pattern using a CuKα ray, wherein $I_{(003)}/I_{(104)}$ is the X-ray diffraction intensity of the (003) plane divided by the X-ray diffraction intensity of the (104) plane, and wherein the positive active material is a compound represented by the formula:

$$Li_xNi_yCo_zMn_{1-y-z-q}X_qO_2$$

wherein x≧1.05, 0<y<0.35, 0<z<0.35, X is Al, Mg, Sr, Ti or La, and 0≦q<0.1.

2. The positive active material according to claim 1 wherein q=0.

3. The positive active material according to claim 1, wherein the molar ratio of the lithium to the elements Ni, Co, and Mn is between 1.05 to 1 and 1.25 to 1.

4. The positive active material according to claim 1, wherein the positive active material has a crystalline structure with an a-axis length between 2.851 Å and 2.861 Å.

5. The positive active material according to claim 1, wherein the positive active material has a crystalline structure with a c-axis length between 14.200 Å and 14.230 Å.

6. The positive active material according to claim 1, wherein the positive active material has three XPS peaks representing Ni(2P3/2) binding energy at between about 854 and 855 eV, between about 856 and 856.6 eV, and between about 861.0 and 861.5 eV.

7. The positive active material according to claim 1, wherein the positive active material has two XPS peaks representing Mn(2P3/2) binding energy at between about 642.4 and 642.6 eV and between abut 643.5 and 644.1 eV.

8. A method of preparing a positive active material for a lithium rechargeable battery comprising:
mixing a lithium-included compound with nickel, cobalt, and manganese in a molar ratio of the lithium to nickel, cobalt, and manganese of between 1.05 and 1.25 to 1;
a first heating step comprising heating of the mixture to a temperature between 450 and 550° C.; and
a second heating step comprising heating the mixture to a temperature between 800 and 900° C.,
wherein the positive active material is a compound represented by the formula:

$$Li_xNi_yCo_zMn_{1-y-z-q}X_qO_2$$

wherein x≧1.05, 0<y<0.35, 0<z<0.35, X is Al, Mg, Sr, Ti or La, and 0≦q<0.1.

9. The method of preparing the positive active material according to claim 8 wherein the positive active material is selected from compounds where q=0.

10. The method of preparing the positive active material according to claim 8 further comprising slowly cooling the mixture to room temperature after the first heating step.

11. The method of preparing the positive active material according to claim 8 further comprising selecting the lithium-included compound from the group consisting of lithium hydroxide, lithium nitrate, and lithium acetate.

12. The method of preparing the positive active material according to claim 8 wherein the nickel, cobalt, and manganese are provided as a compound selected from the group consisting of hydroxides, oxides, nitrates, and sulfates.

13. A lithium rechargeable battery comprising:
a positive electrode comprising the positive active material having an $I_{(003)}/I_{(104)}$ intensity ratio of between 1.15 and 1.21 in an X ray diffraction pattern using a CuKα ray, wherein $I_{(003)}/I_{(004)}$ is the X-ray diffraction intensity of the (003) to the plane divided by the X-ray diffraction intensity of the (104) plane, and wherein the positive active material is a compound represented by the formula:

$$Li_xNi_yCo_zMn_{1-y-z-q}X_qO_2$$

wherein x≧1.05, 0<y<0.35, 0<z<0.35, X is Al, Mg, Sr, Ti or La, and 0≦q<0.1;
a negative electrode comprising a material capable of reversibly intercalating and deintercalating lithium ions; and
an electrolyte.

14. The lithium rechargeable battery according to claim 13, wherein q=0 for the positive active material.

15. The lithium rechargeable battery according to claim 13, wherein the negative active material is a carbonaceous material.

16. The lithium rechargeable battery according to claim 13, wherein the positive active material has a molar ratio of Li/(Ni+Co+Mn) of between 1.05 to 1 and 1.25 to 1.

17. The lithium rechargeable battery according to claim 13, wherein the positive active material has a crystalline structure with an a-axis length between 2.851 Å and 2.861 Å.

18. The lithium rechargeable battery according to claim 13, wherein the positive active material has a crystalline structure with a c-axis length between 14.200 Å and 14.230 Å.

19. The lithium rechargeable battery according to claim 13, wherein the positive active material has three XPS peaks representing Ni(2P3/2) binding energy at between about 854 and 855 eV, between about 856 and 856.6 eV, and between abut 861.0 and 861.5 eV.

20. The lithium rechargeable battery according to claim 13, wherein the positive active material has two XPS peaks representing Mn(2P3/2) binding energy at between about 642.4 and 642.6 eV and 643.5 and 644.1 eV.

* * * * *